United States Patent
Asakura et al.

(10) Patent No.: US 7,034,649 B2
(45) Date of Patent: Apr. 25, 2006

(54) FERRITE MATERIAL, FERRITE SINTERED BODY, AND INDUCTOR

(75) Inventors: Kensaku Asakura, Tokyo (JP); Takuya Aoki, Tokyo (JP); Taku Murase, Tokyo (JP)

(73) Assignee: TDK Corporation, Tokyo (JP)

(*) Notice: Subject to any disclaimer, the term of this patent is extended or adjusted under 35 U.S.C. 154(b) by 5 days.

(21) Appl. No.: 10/931,299

(22) Filed: Aug. 31, 2004

(65) Prior Publication Data
US 2005/0062576 A1   Mar. 24, 2005

(30) Foreign Application Priority Data

| Sep. 3, 2003 | (JP) | 2003-311813 |
| Apr. 22, 2004 | (JP) | 2004-126257 |
| Jun. 15, 2004 | (JP) | 2004-177292 |

(51) Int. Cl.
*H01F 27/24* (2006.01)

(52) U.S. Cl. .................. 336/233; 252/62.59

(58) Field of Classification Search .......... 336/65, 336/83, 200, 233; 252/62.59, 62.6, 62.61, 252/62.62, 62.63
See application file for complete search history.

(56) References Cited
U.S. PATENT DOCUMENTS
5,906,768 A * 5/1999 Kakinuma et al. ....... 252/62.62

2002/0175311 A1 * 11/2002 Aoki et al. .............. 252/62.56

FOREIGN PATENT DOCUMENTS

| JP | 57-017110 | | 1/1982 |
| JP | 01-228108 | | 9/1989 |
| JP | 03-218962 | | 9/1991 |
| JP | 04-323806 | | 11/1992 |
| JP | 05-003112 | | 1/1993 |
| JP | 05-326243 | | 12/1993 |
| JP | 08-325056 | | 12/1996 |
| JP | 2001-348226 | | 12/2001 |
| JP | 2002-060224 | | 2/2002 |
| JP | 2002-075722 | * | 3/2002 |
| JP | 2002-134312 | * | 5/2005 |

* cited by examiner

*Primary Examiner*—Tuyen T Nguyen
(74) *Attorney, Agent, or Firm*—Hogan & Hartson, L.L.P.

(57) ABSTRACT

A ferrite material having a high Q value and also having a small absolute value of $\alpha\mu ir$ in a wide temperature range between −40° C. and 160° C.

A ferrite material, which comprises, as main constituents, 45.5 to 48 mol % of $Fe_2O_3$, 5 to 10.5 mol % of CuO, 26 to 30 mol % of ZnO, and the balance substantially being NiO, and further comprises, as an additive, cobalt oxide within a range between 0.005 and 0.045 wt % in terms of CoO.

The ferrite material of the present invention has properties such as each of the absolute value of $\alpha\mu ir_{-40 \sim 20}$ and the absolute value of $\alpha\mu ir_{20 \sim 160}$ of 3 ppm/° C. or less, and a Q value at 125 kHz of 170 or more.

22 Claims, 6 Drawing Sheets

FIG. 1

| SAMPLE NO. | Fe$_2$O$_3$ | NiO | CuO | ZnO | CoO | μi at 125kHz | RELATIVE TEMPERATURE COEFFICIENT [ppm/°C] αμir$_{-40\sim-20}$ | RELATIVE TEMPERATURE COEFFICIENT [ppm/°C] αμir$_{20\sim160}$ | Q at 125kHz | Tc [°C] | BENDING STRENGTH [kgf/mm$^2$] | STRESS-INSENSITIVE CHARACTERISTIC [%] | MEAN GRAIN SIZE OF SINTERED BODY [μm] | STANDARD DEVIATION [μm] |
|---|---|---|---|---|---|---|---|---|---|---|---|---|---|---|
| | [mol%] | | | | [wt%] | | | | | | | | | |
| 1 | 45.4 | 16.7 | 9.0 | 28.9 | 0.02 | 294 | -1.2 | — | 164 | 156 | 25.5 | -1.2 | 3.85 | 1.43 |
| 2 | 45.7 | 16.7 | 9.0 | 28.6 | 0.02 | 315 | -0.6 | -2.3 | 198 | 162 | 25.1 | -1.7 | 3.95 | 1.58 |
| 3 | 46.6 | 16.7 | 9.0 | 27.7 | 0.02 | 348 | 1.0 | -0.6 | 189 | 183 | 23.6 | -2.7 | 4.13 | 1.61 |
| 4 | 47.5 | 16.7 | 9.0 | 26.8 | 0.02 | 417 | 2.8 | 0.8 | 186 | 210 | 22.7 | -3.5 | 4.53 | 1.72 |
| 5 | 48.1 | 16.4 | 9.0 | 26.5 | 0.02 | 423 | 3.2 | 1.2 | 192 | 218 | 21.5 | -3.8 | 5.08 | 2.01 |
| 6 | 47.8 | 17.7 | 9.0 | 25.5 | 0.02 | 381 | 3.5 | 2.0 | 195 | 230 | 21.2 | -3.1 | 4.61 | 1.69 |
| 7 | 47.8 | 16.7 | 9.0 | 26.5 | 0.02 | 420 | 3.0 | 1.6 | 190 | 215 | 21.8 | -3.4 | 4.57 | 1.72 |
| 8 | 47.8 | 15.7 | 9.0 | 27.5 | 0.02 | 490 | 2.9 | 1.5 | 179 | 197 | 21.2 | -4.1 | 4.62 | 1.59 |
| 9 | 47.8 | 14.7 | 9.0 | 28.5 | 0.02 | 570 | 2.1 | 1.4 | 172 | 179 | 21.1 | -4.5 | 4.67 | 1.67 |
| 10 | 47.8 | 13.7 | 9.0 | 29.5 | 0.02 | 656 | 1.6 | 1.3 | 181 | 166 | 20.8 | -4.7 | 4.58 | 1.63 |
| 11 | 47.8 | 12.7 | 9.0 | 30.5 | 0.02 | 701 | 1.3 | — | 182 | 157 | 20.4 | -5.0 | 4.52 | 1.59 |
| 12 | 47.5 | 19.0 | 4.9 | 28.5 | 0.02 | 372 | 0.5 | -0.3 | 149 | 205 | 20.3 | -5.1 | 3.51 | 1.31 |
| 13 | 47.5 | 18.0 | 6.0 | 28.5 | 0.02 | 358 | 1.8 | 0.0 | 175 | 197 | 22.4 | -4.5 | 3.95 | 1.53 |
| 14 | 47.5 | 15.0 | 9.0 | 28.5 | 0.02 | 502 | 2.1 | 1.0 | 195 | 178 | 22.7 | -4.2 | 4.51 | 1.74 |
| 15 | 47.5 | 14.0 | 10.0 | 28.5 | 0.02 | 650 | 2.8 | 1.4 | 171 | 172 | 21.9 | -4.0 | 4.81 | 1.95 |
| 16 | 47.5 | 13.0 | 11.0 | 28.5 | 0.02 | 757 | 3.2 | 1.9 | 159 | 168 | 20.4 | -3.8 | 5.12 | 2.01 |
| 17 | 46.0 | 16.7 | 9.0 | 28.3 | 0.00 | 375 | -1.1 | -1.6 | 155 | 168 | 24.6 | -2.5 | 3.81 | 1.42 |
| 18 | 46.0 | 16.7 | 9.0 | 28.3 | 0.01 | 354 | -0.5 | -1.1 | 174 | 170 | 24.2 | -2.2 | 3.78 | 1.39 |
| 19 | 46.0 | 16.7 | 9.0 | 28.3 | 0.03 | 327 | 1.3 | 0.1 | 203 | 171 | 23.9 | -2.0 | 3.91 | 1.45 |
| 20 | 46.0 | 16.7 | 9.0 | 28.3 | 0.04 | 323 | 2.1 | 0.7 | 206 | 171 | 24.2 | -1.9 | 3.82 | 1.41 |
| 21 | 46.0 | 16.7 | 9.0 | 28.3 | 0.05 | 315 | 3.1 | 1.4 | 212 | 170 | 24.8 | -1.8 | 3.89 | 1.47 |

FIG. 3

| SAMPLE NO. | TYPE OF FINE POWDER | SPECIFIC SURFACE AREA OF FINE POWDER [m²/g] | MEAN PARTICLE SIZE OF FINE POWDER [μm] | MILLING CONDITIONS | | SINTERING TEMPE- RATURE [°C] | MEAN GRAIN SIZE OF SINTERED BODY [μm] | STANDARD DEVIATION [μm] | $\alpha\mu ir_{-40\sim20}$ [ppm/°C] | $\alpha\mu ir_{20\sim160}$ [ppm/°C] | $\mu i$ at 125kHz | Q at 125kHz |
|---|---|---|---|---|---|---|---|---|---|---|---|---|
| | | | | AMOUNT OF MEDIA | MILLING TIME | | | | | | | |
| 22 | TYPE A | 2.86 | 0.813 | 1kg | 10h | 1020 | 3.78 | 1.34 | 1.18 | -0.90 | 372 | 199 |
| 23 | | | | | | 1040 | 4.66 | 1.70 | 1.90 | -0.77 | 383 | 195 |
| 24 | | | | | | 1060 | 4.74 | 1.85 | 2.54 | -0.6 | 394 | 191 |
| 25 | | | | | | 1080 | 5.14 | 2.20 | 3.12 | -0.58 | 406 | 191 |
| 26 | TYPE B | 2.70 | 0.859 | 1kg | 8h | 1020 | 4.11 | 1.57 | 1.44 | -1.00 | 376 | 197 |
| 27 | | | | | | 1040 | 4.68 | 1.72 | 1.74 | -0.91 | 385 | 201 |
| 28 | TYPE C | 3.16 | 0.782 | 1kg | 12h | 1020 | 3.85 | 1.43 | 1.28 | -0.91 | 363 | 208 |
| 29 | | | | | | 1040 | 4.60 | 1.65 | 1.68 | -0.83 | 375 | 207 |
| 30 | TYPE D | 2.56 | 0.895 | 500g | 16h | 1020 | 4.48 | 1.52 | 1.78 | -0.88 | 378 | 190 |
| 31 | | | | | | 1040 | 4.85 | 1.74 | 1.93 | -0.73 | 392 | 187 |
| 32 | | | | | | 1060 | 5.05 | 2.07 | 3.05 | -0.58 | 400 | 188 |
| 33 | | | | | | 1080 | 5.43 | 2.31 | 3.34 | -0.54 | 412 | 186 |

FIG. 6

| SAMPLE NO. | Fe₂O₃ [mol%] | NiO [mol%] | CuO [mol%] | ZnO [mol%] | CoO [wt%] | μi at 125kHz | RELATIVE TEMPERATURE COEFFICIENT [ppm/°C] | | Q at 125kHz | Tc [°C] | BENDING STRENGTH [kgf/mm²] | STRESS-INSENSITIVE CHARACTER-ISTIC [%] | MEAN GRAIN SIZE OF SINTERED BODY [μm] | STANDARD DEVIATION [μm] |
|---|---|---|---|---|---|---|---|---|---|---|---|---|---|---|
| | | | | | | | α μir₋₄₀∼₋₂₀ | α μir₂₀∼₁₆₀ | | | | | | |
| 34 | 45.7 | 17.0 | 9.0 | 28.3 | | 353 | 0.1 | -1.2 | 156 | 164 | 25.2 | -1.3 | 3.90 | 1.61 |
| 35 | 47.2 | 18.0 | 6.0 | 28.8 | 0.00 | 401 | -0.7 | -2.3 | 143 | 157 | 23.0 | -3.2 | 4.45 | 1.73 |
| 36 | 47.5 | 18.0 | 6.0 | 28.5 | | 445 | 0.9 | 0.6 | 159 | 178 | 22.3 | -3.8 | 4.79 | 1.80 |
| 37 | 46.3 | 17.7 | 8.0 | 28.0 | | 333 | -0.1 | -1.9 | 169 | 170 | 24.2 | -2.3 | 3.84 | 1.41 |

FERRITE MATERIAL, FERRITE SINTERED BODY, AND INDUCTOR

BACKGROUND OF THE INVENTION

1. Field of the Invention

The present invention relates to a ferrite material having a little change in permeability in a wide temperature range, that is, a ferrite material having a small absolute value of temperature coefficient, or the like.

2. Description of the Related Art

In order to obtain a Ni—Cu—Zn ferrite material having a low temperature coefficient, the following proposals have been made so far.

Japanese Patent Laid-Open No. 2002-60224 describes a ferrite material, which comprises, as main constituents, iron oxide in a range between 46.0 and 49.0 mol % in terms of $Fe_2O_3$, copper oxide in a range between 4.0 and 11.0 mol % in terms of CuO, zinc oxide in a range between 30.1 and 33.0 mol % in terms of ZnO, and the balance being nickel oxide, and further comprises, as additives, cobalt oxide in a range between 0.005 and 0.03 wt % in terms of CoO, bismuth oxide in a range between 0.1 and 0.5 wt % in terms of $Bi_2O_3$, silicon oxide in a range between 0.1 and 0.6 wt % in terms of $SiO_2$, and magnesium oxide in a range between 0.05 and 1.0 wt % in terms of MgO.

Japanese Patent Laid-Open No. 2001-348226 describes a ferrite material, which comprises, as main constituents, iron oxide in a range between 40 and 46 mol % in terms of $Fe_2O_3$, zinc oxide in a range between 25.1 and 30 mol % in terms of ZnO, nickel oxide in a range between 10 and 25 mol % in terms of NiO, and the balance being copper oxide, and further comprises, as additives, bismuth oxide in a range of less than 2 wt % in terms of $Bi_2O_3$, and cobalt oxide in a range of 0.1 wt % or less in terms of $Co_3O_4$.

Moreover, Japanese Patent Laid-Open No. 5-3112 describes a ferrite material, which comprises Ni—Cu—Zn ferrites as main constituents, comprising Nb in a range between 0.2 and 0.8 wt % in terms of $Nb_2O_3$, Ta in a range between 0.3 and 1.2 wt % in terms of $Ta_2O_5$, and Mo in a range between 0.15 and 1.35 wt % in terms of $MoO_3$.

Main constituents of a Ni—Cu—Zn ferrite material are controlled, and further, the above additives are contained in the ferrite material, so that the absolute value of a relative temperature coefficient of an initial permeability (hereinafter referred to as αμir) is set at 5 ppm/° C. or less in Japanese Patent Laid-Open Nos. 2002-60224 and 2001-348226, and so that the absolute value of αμir is set at 1.3 ppm/° C. or less in Japanese Patent Laid-Open No. 5-3112.

However, in Japanese Patent Laid-Open Nos. 2002-60224 and 2001-348226, αμir is a value obtained between 20° C. and 60° C., and in Japanese Patent Laid-Open No. 5-3112, αμir is a value obtained between −25° C. and 85° C. Thus, a ferrite material is desired, which has a small absolute value of αμir in a wider temperature range such as a range between −40° C. and 160° C.

The present invention has been made to achieve such technical objects. It is an object of the present invention to provide a ferrite material having a small absolute value of αμir in a wide temperature range between −40° C. and 160° C.

SUMMARY OF THE INVENTION

To achieve the above object, the present invention provides a ferrite material, which comprises, as main constituents, 45.5 to 48 mol % of $Fe_2O_3$, 5 to 10.5 mol % of CuO, 26 to 30 mol % of ZnO, and the balance substantially being NiO, and further comprises, as an additive, cobalt oxide within a range between 0.005 and 0.045 wt % in terms of CoO.

Main constituents are controlled in the above ranges, and cobalt oxide is contained in the ferrite material in a range between 0.005 and 0.045 wt % in terms of CoO, so that the absolute value of αμir can be reduced. This is to say, the ferrite material of the present invention can have properties such that each of the absolute value of $\alpha\mu ir_{-40\sim 20}$ and the absolute value of $\alpha\mu ir_{20\sim 160}$ is 3 ppm/° C. or less. It is to be noted that $\alpha\mu ir_{-40\sim 20}$ and $\alpha\mu ir_{20\sim 160}$ have the following definitions:

$$\alpha\mu ir_{-40\sim 20} = [(\mu i_{20} - \mu i_{-40})/\mu i_{-40}^2] \times [1/(T_{20} - T_{-40})];$$

$$\alpha\mu ir_{20\sim 160} = [(\mu i_{160} - \mu i_{20})/\mu i_{20}^2] \times [1/(T_{160} - T_{20})];$$

$\mu i_{-40}$ represents an initial permeability at −40° C.;
$\mu i_{20}$ represents an initial permeability at 20° C.; and
$\mu i_{160}$ represents an initial permeability at 160° C.

Moreover, the ferrite material of the present invention can have properties such that it has a bending strength of 20 $kgf/mm^2$ or more and the absolute value of a stress-insensitive characteristic of 5% or less. Herein, a bending strength is a value measured according to JIS R1601, and a stress-insensitive characteristic is a value obtained as follows:

$$\text{stress-insensitive characteristic} = (L_1 - L_0)/L_0 \times 100\ (\%),$$

wherein $L_1$ represents an inductance value obtained when a uniaxial compressive force (1 $ton/cm^2$) is applied, and $L_0$ represents an inductance value obtained when a uniaxial compressive force (1 $ton/cm^2$) is not applied.

The ferrite material of the present invention can provide a quality factor (Q value) at 125 kHz of 170 or more, and an initial permeability pi at 125 kHz of 300 or more.

In an embodiment of the ferrite material of the present invention, a ferrite sintered body can be adopted. In this case, the mean grain size of the ferrite sintered body is desirably 5 μm or less. A mean grain size having correlation to αμir is controlled to 5 μm or less, so that each of the absolute value of $\alpha\mu ir_{-40\sim 20}$ and the absolute value of $\alpha\mu ir_{20\sim 160}$ can be set at 3 ppm/° C. or less. It is to be noted that $\alpha\mu ir_{-40\sim 20}$ and $\alpha\mu ir_{20\sim 160}$ can be obtained with the above described formula. Moreover, a standard deviation of such a grain size is preferably set at 2 μm or less. It is effective to decrease the absolute value of αμir.

Based on these findings, the present invention provides a ferrite sintered body, which comprises 45.5 to 48 mol % of $Fe_2O_3$, 5 to 10.5 mol % of CuO, 26 to 30 mol % of ZnO, and the balance substantially being NiO, and which has a mean grain size of 5 μm or less and a standard deviation of a grain size of 2 μm or less.

In this ferrite sintered body, containtment of cobalt oxide is optional. Main constituents of the ferrite sintered body are controlled in the above ranges, the mean grain size is set at 5 μm or less, and the standard deviation of a grain size is set at 2 μm or less, so that each of the absolute value of $\alpha\mu ir_{-40\sim 20}$ and the absolute value of $\alpha\mu ir_{20\sim 160}$ can be set at 3 ppm/° C. or less. Moreover, this ferrite sintered body can provide a quality factor (Q value) at 125 kHz of 140 or more.

Furthermore, the ferrite material of the present invention may also contain, as an additive, cobalt oxide in a range between 0.005 and 0.045 wt % in terms of CoO.

The ferrite material of the present invention has a excellent stress-insensitive characteristic. Accordingly, the ferrite material of the present invention is preferably used for an inductor.

Thus, the present invention provides an inductor, which comprises: a ferrite sintered body comprising, as main constituents, 45.5 to 48 mol % of $Fe_2O_3$, 5 to 10.5 mol % of CuO, 26 to 30 mol % of ZnO, and the balance substantially being NiO, and further comprising, as an additive, cobalt oxide within a range between 0.005 and 0.045 wt % in terms of CoO; and a resin mold covering the above ferrite sintered body.

Moreover, the present invention provides an inductor, which comprises: a ferrite sintered body comprising 45.5 to 48 mol % of $Fe_2O_3$, 5 to 10.5 mol % of CuO, 26 to 30 mol % of ZnO, and the balance substantially being NiO, and having a mean grain size of 5 μm or less and a standard deviation of a grain size is 2 μm or less; and a resin mold covering the above ferrite sintered body.

A ferrite sintered body used for these inductors has excellent properties, such as a bending strength of 20 kgf/mm$^2$ or more, which is measured according to JIS R1601, the absolute value of a stress-insensitive characteristic of 5% or less, an initial permeability at 125 kHz of 300 or more, and each of the absolute value of $\alpha\mu ir_{-40 \sim 20}$ and the absolute value of $\alpha\mu ir_{20 \sim 160}$ of 3 ppm/° C. or less. The values of $\alpha\mu ir_{-40 \sim 20}$ and $\alpha\mu ir_{20 \sim 160}$, and a stress-insensitive characteristic are obtained with the above described formulas.

The present invention provides a ferrite material having a small absolute value of $\alpha\mu ir$ in a wide temperature range between –40° C. and 160° C.

BRIEF DESCRIPTION OF THE DRAWINGS

FIG. 1 is a table showing the relationship between the compositions and temperature characteristic of samples prepared in Example 1;

FIG. 3 is a table showing the relationship between conditions for producing of sintered bodies and temperature characteristic in Example 2;

FIG. 6 is a table showing the compositions and temperature characteristic of samples prepared in Example 3.

DETAILED DESCRIPTION OF THE PREFERRED EMBODIMENTS

<Composition>

Figure 2:
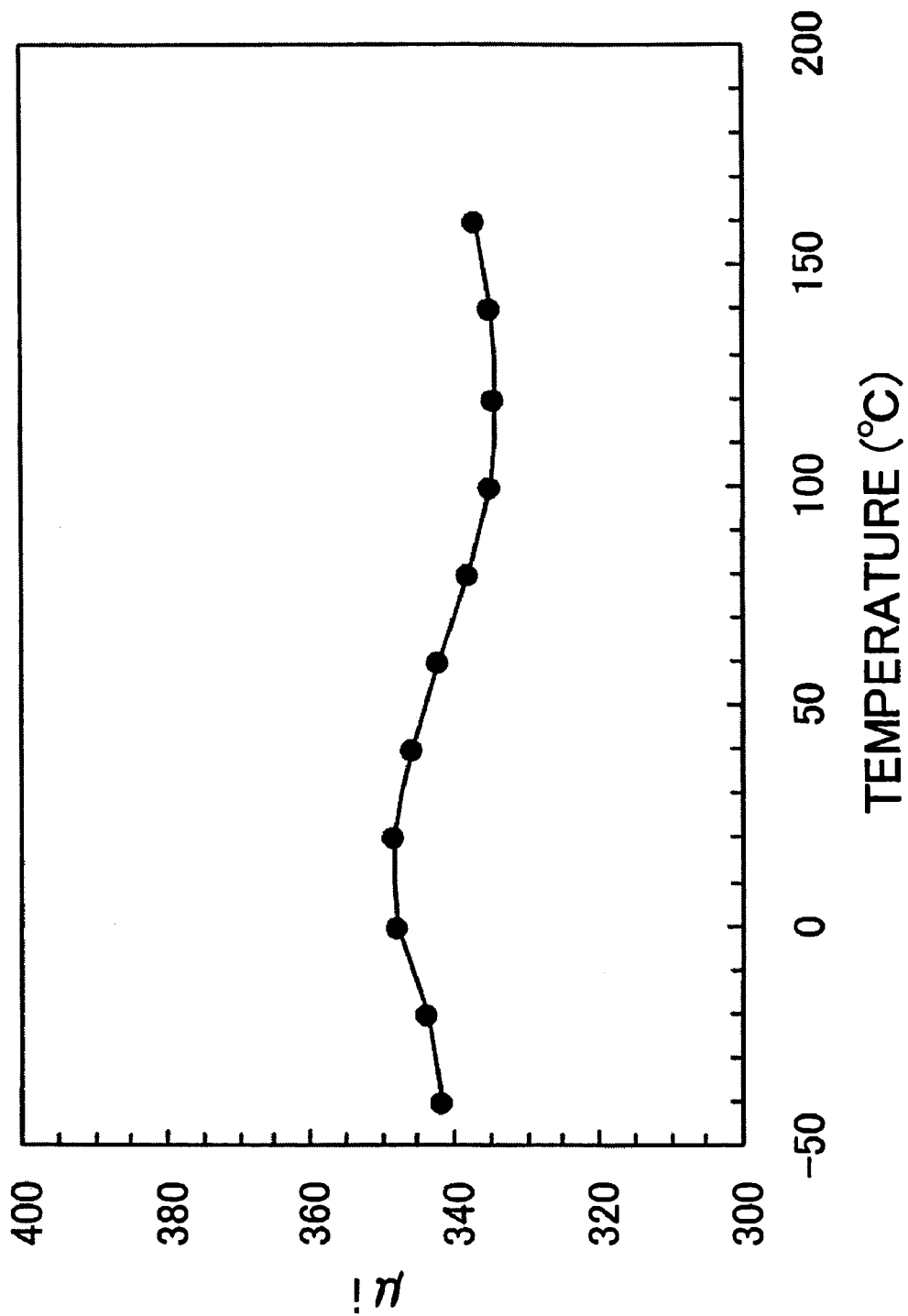
FIG. 2 is a graph showing temperature characteristic of the initial permeability (μi) of sample No. 3.

The reason for limiting the composition of the ferrite material of the present invention will be described below.

If the content of $Fe_2O_3$ constituting a main constituent of the ferrite material of the present invention is less than 45.5 mol %, value of Q factor (hereinafter referred to as Q value) decreases and Curie point (hereinafter referred to as Tc) also decreases. In contrast, if the content of $Fe_2O_3$ exceeds 48 mol %, $\alpha\mu ir$, and in particular, $\alpha\mu ir$ at –40° C. to 20° C. (($\alpha\mu ir_{-40 \sim 20}$) increases, and its absolute value exceeds 3 ppm/° C. Accordingly, in the present invention, the content of $Fe_2O_3$ is set between 45.5 and 48 mol %. The content of $Fe_2O_3$ is preferably between 45.7 and 47.5 mol %, and more preferably between 46.0 and 47.0 mol %.

If the content of CuO constituting a main constituent of the ferrite material of the present invention is less than 5 mol %, a Q value decreases, and a stress-insensitive characteristic is improved. In contrast, if the content of CuO exceeds 10.5 mol %, $\alpha\mu ir$, and in particular, $\alpha\mu ir$ at –40° C. to 20° C. ($\alpha\mu ir_{-40 \sim 20}$) increases. Accordingly, in the present invention, the content of CuO is set between 5 and 10.5 mol %. The content of CuO is preferably between 5.5 and 10 mol %, and more preferably between 6 and 9.5 mol %.

If the content of ZnO constituting a main constituent of the ferrite material of the present invention is less than 26 mol %, $\alpha\mu ir$, and in particular, $\alpha\mu ir$ at –40° C. to 20° C. ($\alpha\mu ir_{-40 \sim 20}$) increases. In contrast, if the content of ZnO exceeds 30 mol %, Tc decreases. Accordingly, in the present invention, the content of ZnO is set between 26 and 30 mol %. The content of ZnO is preferably between 26.5 and 29.5 mol %, and more preferably between 27 and 29 mol %.

The balance of the main constituents of the ferrite sintered body of the present invention is substantially NiO.

The ferrite material of the present invention contains cobalt oxide at 0.005 to 0.045 wt % in terms of CoO with respect to the above main constituents. CoO is a constituent important to obtain a high Q value and to reduce the absolute value of $\alpha\mu ir$. If CoO is less than 0.005 wt %, the Q value decreases, but if CoO exceeds 0.045 wt %, $\alpha\mu ir$ increases. The content of CoO is preferably between 0.01 and 0.03 wt %, and more preferably between 0.015 and 0.025 wt %.

A ferrite material having the above composition has an initial permeability μi at 125 kHz of 300 or more, a Q value at 125 kHz of 170 or more, and each $\alpha\mu ir_{-40 \sim 20}$ and $\alpha\mu ir_{20 \sim 160}$ being such a low value as 3 ppm/° C. or less at an absolute value. Moreover, the ferrite material of the present invention can have properties such that each of $\alpha\mu ir_{-40 \sim 20}$ and $\alpha\mu ir_{20 \sim 160}$ is 3 ppm/° C. or less at an absolute value.

By the way, $\alpha\mu ir$ is defined as follows:

$$\alpha\mu ir = [(\mu i_2 - \mu i_1)/\mu i_1^2] \times [1/(T_2 - T_1)],$$

wherein $\mu i_1$ represents an initial permeability at temperature $T_1$, and
$\mu i_2$ represents an initial permeability at temperature $T_2$.

The present invention is directed towards decreasing the absolute value of $\alpha\mu ir$ in a temperature range between –40° C. and 160° C. In the ferrite material of the present invention, however, a peak of μi (initial permeability) is present around room temperature. Accordingly, if $\alpha\mu ir$ is obtained under conditions where $\mu i_1$ is defined as an initial permeability at –40° C. and $\mu i_2$ is defined as an initial permeability at 160° C., there is a risk that although the temperature coefficient of the initial permeability μi increases at the above peak position, it might not be reflected. Hence, in the present invention, $\alpha\mu ir$ is obtained by dividing temperature into two temperature ranges, –40° C. to 20° C. and 20° C. to 160° C., and the absolute value of each $\alpha\mu ir$ is required to be 3 ppm/° C. or less.

Moreover, the ferrite material of the present invention can have Tc (Curie temperature) of 160° C. or higher by adopting the above composition. High Tc is required to ensure the use of the ferrite material in a high temperature environment. In the present invention, such high Tc as 180° C. or higher, and further as 200° C. or higher can be obtained.

Furthermore, the ferrite material of the present invention is also excellent in mechanical strength. More specifically, it has a three-point bending strength of 20 kgf/mm$^2$ or more. It is to be noted that three-point bending strength is a value measured according to JIS R1601, using a rectangular sample.

Still further, the ferrite material of the present invention can have the absolute value of a stress-insensitive characteristic of 5% or less. The term "stress-insensitive characteristic" is herein used to mean the degree of change in the inductance value of a ferrite material to compressive stress.

In the case of a resin mold-type inductor, a ferrite material is molded with resin. When the resin is cured, compressive stress is applied to the ferrite material. Since the inductance value of a ferrite material is changed depending on the magnitude of compressive stress, it is desired that a ferrite material used for a resin mold-type inductance component has a small changiability in inductance value depending on compressive stress and has an excellent stress-insensitive characteristic. The ferrite material of the present invention having a stress-insensitive characteristic of 5% or less at an absolute value meets the above requirements, and thus, it can be used as a ferrite material used for a resin mold-type inductor. It is also possible for the ferrite material of the present invention to have a stress-insensitive characteristic of 4% or less at an absolute value, and further to have a stress-insensitive characteristic of 3% or less at an absolute value. A stress-insensitive characteristic can be specifically calculated by the following method.

A wire is wound on a rectangular sample 20 times, and a uniaxial compressive force is then applied thereto at a certain rate. During the application of a uniaxial compressive force, an inductance value is continuously measured. Thereafter, the changiablity in inductance is calculated from the obtained measurement values. The uniaxial compressive force is set at 1 ton/cm² herein, and the inductance changiablity is obtained with the following formula:

$(L_1-L_0)/L_0 \times 100$ (%), wherein $L_1$ represents an inductance value obtained when a uniaxial compressive force is applied, and $L_0$ represents an inductance value obtained when a uniaxial compressive force is not applied.

A ferrite material essentially containing cobalt oxide is described in detail above. However, even in a case where no cobalt oxide is used, a ferrite material having excellent temperature characteristic such as each of $\alpha\mu ir_{-40\sim 20}$ and $\alpha\mu ir_{20\sim 160}$ being 3 ppm/° C. or less can be obtained by setting the composition of the main constituents as the above described composition and applying the microstructures of a sintered body described below. Such a ferrite material also has properties such as an initial permeability at 125 kHz μi of 300 or more and a Q value at 125 kHz of 140 or more.

<Microstructures>

A ferrite sintered body is an embodiment of the ferrite material of the present invention. The ferrite sintered body of the present invention is characterized in that a mean grain size is 5 μm or less and a standard deviation of a grain size is 2 μm or less. In order to obtain a ferrite sintered body having fine structures with a little range of dispersion, milling conditions of the calcined powder, sintering conditions, etc. maybe controlled. These desired conditions will be described later.

In the present invention, a mean grain size is set at 5 μm or less. This is because since there is a strong correlation between $\alpha\mu ir$ and a mean grain size, if a mean grain size exceeds 5 μm, the absolute value of $\alpha\mu ir$ at −40° C. to 20° C. ($\alpha\mu ir_{-40\sim 20}$) exceeds 3 ppm/° C. On the other hand, as shown in Example 2 described later, the value of $\alpha\mu ir$ at 20° C. to 160° C. ($\alpha\mu ir_{20\sim 160}$) tends to decrease as a mean grain size decreases. Thus, in the present invention, a mean grain size is set at 5 μm or less, and preferably between 2 and 5 μm. By adopting such a range, each of $\alpha\mu ir$ at −40° C. to 20° C. ($\alpha\mu ir_{-40\sim 20}$) and $\alpha\mu ir$ at 20° C. to 160° C. ($\alpha\mu ir_{20\sim 160}$) can be controlled to 3 ppm/° C. or less, preferably 2.5 ppm/° C. or less, and more preferably to 2 ppm/° C. or less, at an absolute value.

Moreover, in the present invention, a standard deviation is set at 2 μm or less. This is because there is also a correlation between a standard deviation of a grain size and $\alpha\mu ir$. By setting a standard deviation at 2 μm or less, each of $\alpha\mu ir$ at −40° C. to 20° C. ($\alpha\mu ir_{-40\sim 20}$) and $\alpha\mu ir$ at 20° C. to 160° C. ($\alpha\mu ir_{20\sim 160}$) can be controlled to 3 ppm/° C. or less at an absolute value.

When a mean grain size is 5 μm or less, a standard deviation of a grain size is preferably 2 μm or less. In this case, a standard deviation is preferably 1.9 μm or less, and more preferably 1.5 μm or less. By setting a mean grain size at 5 μm or less and setting a standard deviation of a grain size at 1.5 μm or less, it is also possible to control each of $\alpha\mu ir$ at −40° C. to 20° C. ($\alpha\mu ir_{-40\sim 20}$) and $\alpha\mu ir$ at 20° C. to 160° C. ($\alpha\mu ir_{20\sim 160}$) to 2.0 ppm/° C. or less at an absolute value.

In addition, a standard deviation depends on a mean grain size to a certain extent. However, it is possible to fluctuate a standard deviation by the means described below, such as control of media conditions during milling, adjustment of a milling time, adjustment of an amount processed per unit time, or control of sintering conditions.

Next, a preferred method of producing the ferrite material of the present invention will be described below in the order of steps.

<Blending and Mixing Steps>

First, as raw material powders used as main constituents, $Fe_2O_3$ powders, CuO powders, ZnO powders, and NiO powders are prepared, for example. In addition to these powders used as main constituents, CoO powders used as an additive are also prepared. The particle size of each prepared raw material powder may be selected as appropriate in a range between 0.1 and 10 μm, and preferably between 0.1 and 5 μm. The prepared raw material powders are subjected to wet mixing using a ball mill, for example. Mixing may depend on operation conditions of a ball mill, but if the mixing is carried out for approximately 20 hours, a uniformly mixed state can be obtained. CoO as an additive may be added not only during wet mixing, but also during a step of milling calcined powders, which will be described later. Effects obtained by addition of CoO are the same in both the above cases.

In addition, in the present invention, raw materials used as main constituents are not limited to those described above, but complex oxide powders containing two or more types of metals may be used as raw materials for main constituents. For example, an aqueous solution containing ferric chloride and Ni chloride is subjected to oxidizing roasting, so as to obtain complex oxide powders containing Fe and Ni. These powders maybe mixed with ZnO powders to prepare main constituent raw materials. In this case, calcining described later is unnecessary.

<Calcining Step>

After mixing raw material powders, calcining is carried out. Calcining may be carried out at a retention temperature between 700° C. and 950° C., and more preferably between 750° C. and 900° C., in air. A retention time for calcining may be 2 to 4 hours.

<Milling Step>

Calcined powders are milled to a mean particle size of approximately between 0.5 and 2.0 μm, and preferably between 0.5 and 1.0 μm, using a ball mill or jet mill. Other than mean particle size, specific surface area is also used as an indicator of the size of a fine powder. Such specific surface area may be set between 2.0 and 4.0 m$^2$/g, and preferably between 2.5 and 3.5 m$^2$/g.

In order to obtain a sintered body having a mean grain size of 5 μm or less and a standard deviation of a grain size of 2 μm or less, it is necessary to compact powders having a small particle size and a narrow particle size distribution. Accordingly, it is desired to obtain powders having a small particle size and a narrow particle size distribution in the milling step. For example, control of media conditions, adjustment of a milling time, adjustment of an amount processed per unit time, and adjustment of the concentration of a slurry in the case of wet blending, maybe carried out, so as to obtain powders having a small particle size and a narrow particle size distribution.

More specifically, when milling is carried out with a ball mill, control of media conditions (increase of the amount of media, etc.) and extension of a milling time are effective. If the amount of media is small, it becomes difficult to obtain fine powders. Accordingly, the amount of media is preferably set between 600 and 1800 g with respect to 200 g of a product to be processed. In addition, a milling time may be set to such an extent that a certain specific surface area can be obtained.

Moreover, in order to obtain powders with a small particle size and a narrow particle size distribution, it is also effective to carry out milling using a jet mill. As a jet mill, those equipped with a classifier are preferable. By using a jet mill equipped with a classifier, coarse powders can be eliminated or milled again, so that a particle size distribution of interest can be obtained. Furthermore, it is also effective to change the rate of milling.

A step of obtaining powders with a small particle size and a narrow particle size distribution is not limited to the above milling step. For example, after completion of the milling step, operations to eliminate coarse powders or to mill them again may be carried out on the powders obtained in the milling step, so as to obtain fine powders with a narrow particle size distribution.

Milled powders consisting of main constituents and additives are preferably granulated to smoothly carry out the following compacting step. Granulation of powders facilitates control of a particle size distribution to a narrow range.

A suitable binder such as polyvinyl alcohol (PVA) is added in a small amount to the milled powders, and the mixture is then sprayed and dried with a spay drier, so as to obtain granules. The particle size of a granule obtained is preferably approximately between 60 and 200 μm.

The obtained granules are compacted into a desired form, using a press equipped with a die with a certain shape. The obtained compacted body is then subjected to a sintering step. A sintering temperature may be kept between 900° C. and 1150° C., preferably between 960° C. and 1100° C., and more preferably between 980° C. and 1060° C. If a sintering temperature is higher than 1070° C., grain growth easily progresses, and it thereby becomes difficult to control the mean grain size of a sintered body to 5 μm or less. In contrast, if a sintering temperature is lower than 900° C., the density of a sintered body decreases, and a stress-insensitive characteristic thereby also decreases. This is not desirable.

A sintering time may be 1 to 4 hours. As a sintering time extends, grain growth progresses, and a grain size increases. As a grain size increases, a standard deviation of a grain size also increases. Accordingly, in order to set a mean grain size at 5 μm or less, control of a sintering time, as well as control of a sintering temperature, is important.

Sintering may be carried out in air.

EXAMPLE 1

As main constituents, Fe$_2$O$_3$ powders, ZnO powders, NiO powders, and CuO powders were weighed to obtain ferrites having compositions (mol %) shown in FIG. 1. CoO was added in an amount (wt %) shown in FIG. 1 with respect to the main constituents.

Thereafter, these raw materials were subjected to wet mixing with a ball mill, and the mixed powders were subjected to calcining at 850° C. for 2 hours. The calcined powders were subjected to mixing and milling using a ball mill. The fine powders have a mean particle size of 0.5 μm.

Subsequently, a polyvinyl alcohol aqueous solution was added as a binder to the obtained each calcined powder for granulation. The thus obtained granules each having a mean particle size of 70 μm were subjected to compacting using a press, so as to obtain a toroidal sample (outer diameter: 20 mm, inner diameter: 10 mm, height: 5 mm) used in evaluation of electromagnetic properties and a rectangular sample (width: 5 mm, thickness: 4 mm, length: 50 mm) used in evaluation of mechanical strength. Compacting was carried out such that a density of a compacted body became 3.20 Mg/m$^3$. The compacted body was sintered in air at 1020° C. for 2 hours, so as to obtain samples Nos. 1 to 21 shown in FIG. 1.

A wire was wound on the obtained toroidal sample 20 times, and thereafter, permeability at 125 kHz was measured with an impedance analyzer (4192A manufactured by Yokokawa Hewlett-Packard). FIG. 1 shows μi, αμir$_{-40 \sim 20}$, and αμir$_{20 \sim 160}$, which are based on the above measurement results. FIG. 2 is a graph showing temperature characteristic (−40° C. to 160° C.) of μi of sample No. 3. From FIG. 2, it is found that μi has a peak around room temperature. Incidentally, a relative temperature coefficient (αμir) obtained from initial permeability (μi) at −40° C. and at 160° C. is −0.2 ppm/° C.

Moreover, a wire was wound on the obtained toroidal sample 20 times, and then, an R value at 125 kHz was measured with the above impedance analyzer. Thereafter, a Q value was obtained with a formula R/2πfL=1/Q. The results are shown in FIG. 1.

Furthermore, Tc of the obtained toroidal sample was measured. Tc was measured using a thermal analysis device (TA7000 manufactured by Shinku-Riko, Inc.).

Subsequently, the obtained rectangular sample was measured in terms of three-point bending strength and stress-insensitive characteristic. The results are shown also in FIG. 1.

As shown in FIG. 1, samples (Nos. 2 to 4, 7 to 10, 13 to 15, and 18 to 20), each containing, as main constituents, 45.5 to 48.0 mol % of Fe$_2$O$_3$, 5.0 to 10.5 mol % of CuO, 26.0 to 30.0 mol % of ZnO, and the balance substantially being NiO, and further containing, as an additive, CoO within a range between 0.005 and 0.045 wt %, have properties such as αμir at −40° C. to 20° C. and at 20° C. to 160° C. being 3 ppm/° C. or less, a Q value of 170 or more, and Tc of 160° C. or higher. In addition, these samples have a bending strength of 20 kgf/mm$^2$ or more and a stress-insensitive characteristic of 5% or less.

Referring to samples Nos. 1 to 5 based on the above premise, it is found that when the amount of Fe$_2$O$_3$ is such small as 45.4 mol %, a quality factor (Q value) becomes less than 170. In contrast, when the amount of $Fe_2O_3$ is such large as 48.1 mol %, $\alpha\mu ir_{-40\sim20}$ exceeds 3 ppm/° C.

In addition, referring to samples Nos. 6 to 11, when the amount of ZnO is such small as 25.5 mol %, $\alpha\mu ir_{-40\sim20}$ exceeds 3 ppm/° C. In contrast, the amount of ZnO is such large as 30.5 mol %, Tc becomes lower than 160° C.

Moreover, referring to samples Nos. 12 to 16, when the amount of CuO is such small as 4.9 mol %, a Q value becomes less than 170 and a stress-insensitive characteristic also decreases to −5.1%. In contrast, when the amount of CuO is such large as 11.0 mol %, $\alpha\mu ir_{-40\sim20}$ exceeds 3 ppm/° C. and a Q value becomes less than 170.

Furthermore, referring to samples Nos. 17 to 21, if no CoO is added, a Q value becomes low such as less than 170. However, the additive amount of CoO becomes such large as 0.05 wt %, $\alpha\mu ir_{-40\sim20}$ exceeds 3 ppm/° C.

As stated above, by controlling main constituents and an additive within a range that is recommended by the present invention, it becomes possible to achieve a high Q value and also to reduce the absolute value of a temperature coefficient in a wide temperature range between −40° C. and 160° C.

Subsequently, the mean particle size of each of samples Nos. 1 to 21 was obtained. Based on the obtained results, a standard deviation of a grain size was obtained. The results are shown in FIG. 1. It is to be noted that the grain size of a sintered body is herein obtained from results, which are obtained by observing the section and measuring each grain size by image analysis. More specifically, the section of a sintered body, treated by polishing, was observed with an optical microscope to recognize each particle. Thereafter, the area of each grain was obtained by image processing, and the diameter of a circle having the same area as the above area of a grain was calculated. 200 to 300 grains were measured per sample. A mean grain size was defined as a mean value of the grain sizes among all the measured grains.

It is found from FIG. 1 that all the samples having properties, such as $\alpha\mu ir$ at −40° C. to 20° C. and at 20° C. to 160° C. being 3 ppm/° C. or less, have the mean grain size of a sintered body of 5 μm or less and a standard deviation of 2 μm or less.

EXAMPLE 2

Example 2 is an experiment that was carried out to examine the relationship between the mean grain size of a sintered body and $\alpha\mu ir$, and the relationship between the standard deviation of the grain size of a sintered body and $\alpha\mu ir$.

As main constituents, $Fe_2O_3$ powders, ZnO powders, NiO powders, and CuO powders were weighed to obtain ferrites having a composition (mol %) consisting of $Fe_2O_3$: 46.3, NiO: 17.1, CuO: 8.0, and ZnO: 28.6 (mol %). Then, 0.02 wt % of CoO was added to the main constituents.

Thereafter, these raw materials were subjected to wet mixing using a ball mill, and the mixed powders were subjected to calcining at 850° C. for 2 hours. Thereafter, 200 g of the calcined powders were milled with a ball mill under various milling conditions shown in FIG. 3, so as to obtain 4 types of fine powders. The specific surface areas and mean particle sizes of the obtained fine powders are shown in FIG. 3. Hereinafter, the obtained fine powders are appropriately referred to as "fine powders of type A (specific surface area: 2.86 m²/g, mean particle size: 0.813 μm)," "fine powders of type B (specific surface area: 2.70 m²/g, mean particle size: 0.859 μm)," "fine powders of type C (specific surface area: 3.16 m²/g, mean particle size: 0.782 μm)," and "fine powders of type D (specific surface area: 2.56 m²/g, mean particle size: 0.895 μm)."

Subsequently, a polyvinyl alcohol aqueous solution was added as a binder to each of the obtained fine powders of types A to D for granulation. The thus obtained granules each having a mean particle size between 60 and 200 μm were subjected to press compacting, so as to obtain a toroidal sample (outside diameter: 20 mm, inside diameter: 10 mm, height: 5 mm) used in evaluation of electromagnetic properties. Compacting was carried out such that a density of a compacted body became 3.20 Mg/m³.

The compacted body was sintered at temperatures shown in FIG. 3, so as to obtain samples Nos. 22 to 33.

The mean grain sizes of samples Nos. 22 to 33 were obtained under the same conditions as in Example 1. Based on the obtained results, standard deviations of grain sizes were obtained. These results are shown in FIG. 3.

Figure 4:
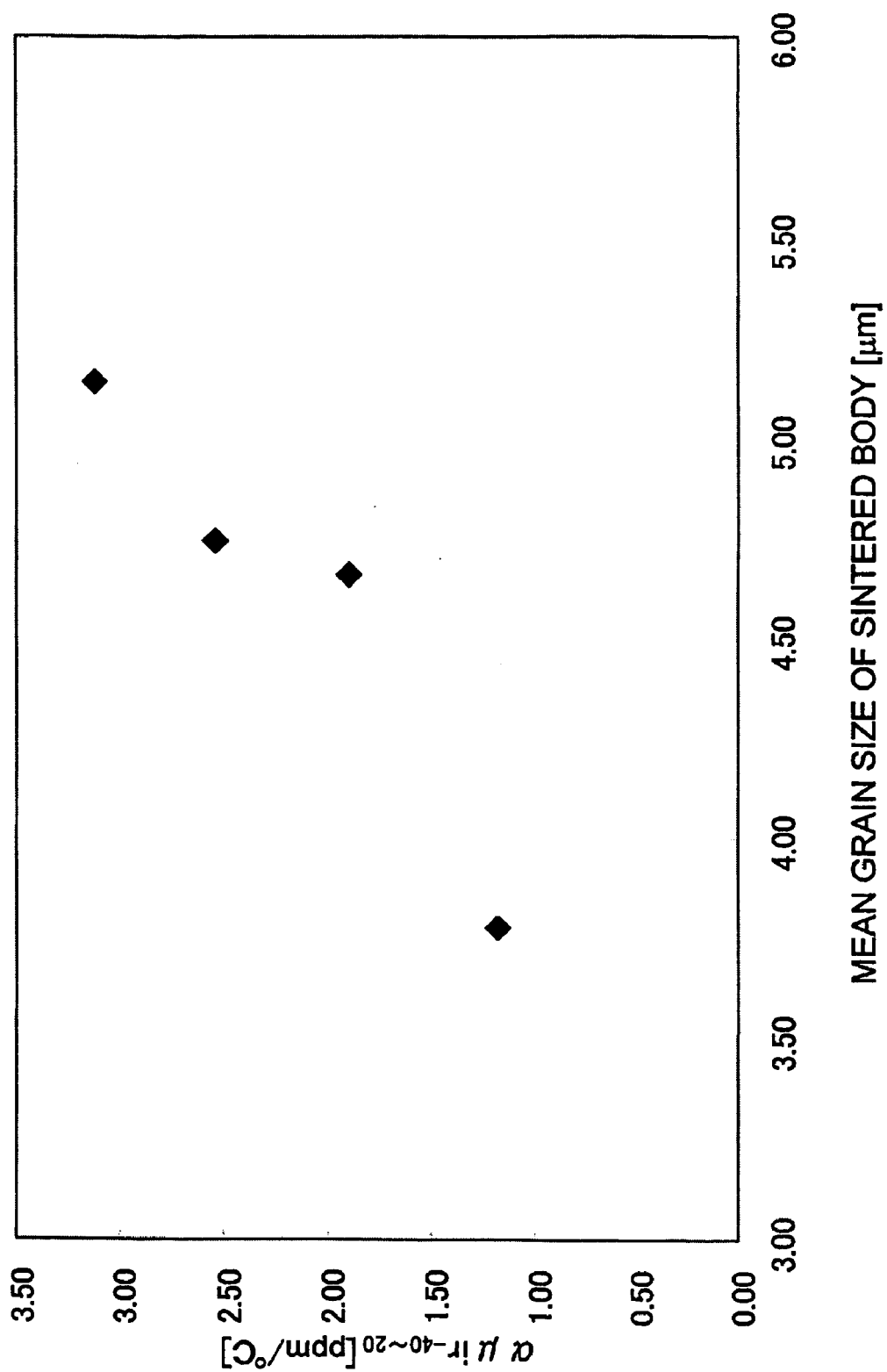
FIG. 4 is a graph showing the relationship between the mean grain sizes of sintered bodies and $\alpha\mu ir_{-40 \sim 20}$.
Figure 5:
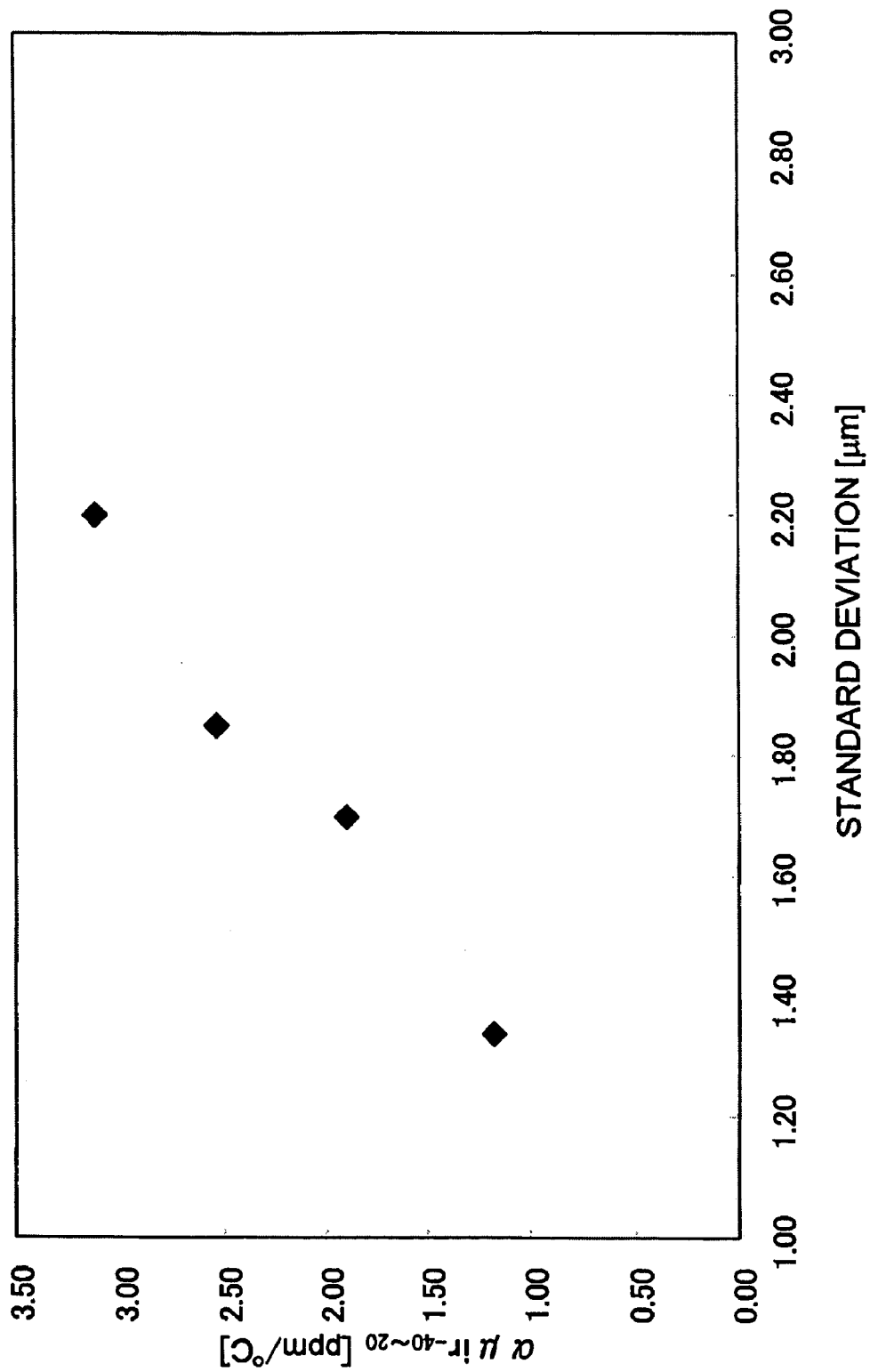
FIG. 5 is a graph showing the relationship between the standard deviations of grain sizes and $\alpha\mu ir_{-40 \sim 20}$.

Subsequently, initial permeability of samples Nos. 22 to 33 were measured under the same conditions as in Example 1. FIG. 3 shows μi, $\alpha\mu ir_{-40\sim20}$, and $\alpha\mu ir_{20\sim160}$, which are based on the above measurement results. FIG. 4 is a graph showing the relationship between the mean grain sizes of the sintered bodies of samples Nos. 22 to 25 and $\alpha\mu ir_{-40\sim20}$. FIG. 5 is a graph showing the relationship between the standard deviations of the grain sizes of samples Nos. 22 to 25 and $\alpha\mu ir_{-40\sim20}$.

Moreover, the Q values of samples Nos. 22 to 33 were obtained under the same conditions as in Example 1. The results are shown in FIG. 3.

As shown in FIG. 3, even using fine powders having the same specific surface area and the same mean particle size, the mean grain size and standard deviation of a sintered body are increased by increasing a sintering temperature.

From the comparison made between samples Nos. 22 to 25 which used the fine powders of type A and samples Nos. 30 to 33 which used the fine powders of type D, it is found that although the same sintering conditions are applied, if different milling conditions are applied, the mean grain size and standard deviation of the obtained sintered bodies are different. More specifically, samples Nos. 22 to 25, which used the fine powders of type A, were compared with samples Nos. 26 and 27, which used the fine powders of type B. As a result, it was confirmed that as the particle size of a fine powder decreases and as a milling time becomes long, the mean grain size and standard deviation of the obtained sintered body can be reduced. It was also confirmed that although a milling time is extended, if the amount of media is small, the mean particle size of a fine powder is likely to be large, and that when such fine powders are sintered, the mean grain size of the obtained sintered body is also likely to be large.

As shown in FIGS. 3 and 4, in all cases of samples Nos. 22 to 25, as the mean grain size increases, $\alpha\mu ir_{-40\sim20}$ increases. In FIG. 4, in samples Nos. 25, 32, and 33, whose mean grain size exceeds 5 μm, $\alpha\mu ir$ at −40° C. to 20° C. ($\alpha\mu ir_{-40\sim20}$) exceeds 3 ppm/° C. On the other hand, in the samples of the present invention (samples Nos. 22 to 24 and 26 to 31) whose mean grain size is 5 μm or less, each of $\alpha\mu ir_{-40\sim20}$ and $\alpha\mu ir_{20\sim160}$ can be 3 ppm/° C. or less at an absolute value.

Next, focusing attention on a standard deviation and $\alpha\mu ir$, there is a correlation also between a standard deviation and $\alpha\mu ir$, as shown in FIG. 5. Samples (samples Nos. 22 to 24 and 26 to 31) having a standard deviation of 2 μm or less can have each of $\alpha\mu ir_{-40\sim20}$ and $\alpha\mu ir_{20\sim160}$ of 3 ppm/° C. or less at an absolute value. In contrast, samples (samples Nos. 25, 32, and 33) having a standard deviation of more than 2 μm have a high αμir$_{-40\sim20}$ value. Accordingly, these samples can achieve such a low αμir value as 3 ppm/° C. or less at an absolute value only in a narrow temperature range.

From these results, it was confirmed that a mean grain size is set at 5 μm or less and a standard deviation is set at 2 μm or less, which are within the range recommended by the present invention, so that the decrease of a temperature coefficient can be obtained in a wide temperature range between −40° C. and 160° C. Moreover, the sample of the present invention has properties such as an initial permeability μi at 125 kHz as a measurement frequency being 300 or more and a Q value of 170 or more. Accordingly, the means of the present invention, which set a mean grain size at 5 μm or less and a standard deviation at 2 μm or less, do neither affect permeability nor Q value.

EXAMPLE 3

Example 3 is an experiment that was carried out on a composition containing no CoO to examine the relationship between the mean grain size of a sintered body and αμir, and the relationship between the standard deviation of the grain size of a sintered body and αμir.

As main constituents, $Fe_2O_3$ powders, ZnO powders, NiO powders, and CuO powders were weighed to obtain ferrites having compositions (mol %) shown in FIG. 6. Samples Nos. 34 to 37 were obtained under the same conditions as in Example 2 with the exceptions that fine powders described below were used and that calcining conditions and sintering conditions were determined as follows.
Specific surface area of fine powder: 2.7 m$^2$/g
Mean particle size of fine powder: 0.86 μm
Calcining Conditions
  At 850° C. for 2 hours
Sintering Conditions
  At 1020° C. for 2 hours With regard to samples Nos. 34 to 37, μi, αμir, a Q value, a bending strength, a stress-insensitive characteristic, the mean grain size of a sintered body, and the standard deviation of the grain size of a sintered body were obtained under the same conditions as in Example 1. The results are shown in FIG. 6.

As shown in FIG. 6, even in the composition containing no CoO, each of αμir$_{-40\sim0}$ and αμir$_{20\sim160}$ of 3 ppm/° C. or less at an absolute value could be obtained by setting the mean grain size of a sintered body and the standard deviation of the grain size of a sintered body within a range recommended by the present invention.

What is claimed is:

1. A ferrite material, which comprises, as main constituents, 45.5 to 48 mol % of $Fe_2O_3$, 5 to 10.5 mol % of CuO, 26 to 29.5 mol % of ZnO, and the balance substantially being NiO, and further comprises, as an additive, cobalt oxide within a range between 0.005 and 0.045 wt % in terms of CoO.

2. A ferrite material according to claim 1, wherein each of the absolute value of αμir$_{-40\sim20}$ and the absolute value of αμir$_{20-160}$ is 3 ppm/° C. or less,
  wherein $\alpha\mu i r_{-40\sim20}=[(\mu i_{20}-\mu i_{-40})/\mu i_{-40}^2]\times[1/(T_{20}-T_{-40})]$, $\alpha\mu i r_{20\sim160}=[(\mu i_{160}-\mu i_{20})/\mu i_{20}^2]\times[1/(T_{160}-T_{20})]$, μi$_{-40}$ represents an initial permeability at −40° C.,
  μi$_{20}$ represents an initial permeability at 20° C., and
  μi$_{160}$ represents an initial permeability at 160° C.

3. A ferrite material according to claim 1, which has a bending strength of 20 kgf/mm$^2$ or more, and the absolute value of stress-insensitive characteristic of 5% or less, wherein a bending strength is a value measured according to JIS R1601, stress-insensitive characteristic=$(L_1-L_0)/L_0\times100$ (%)

$L_1$ represents an inductance value obtained when a uniaxial compressive force (1 ton/cm$^2$) is applied, and
  $L_0$ represents an inductance value obtained when a uniaxial compressive force (1 ton/cm$^2$) is not applied.

4. A ferrite material according to claim 1, wherein a quality factor (Q value) at 125 kHz is 170 or more.

5. A ferrite material according to claim 1, wherein an initial permeability μi at 125 kHz is 300 or more.

6. A ferrite material according to claim 1, wherein said ferrite material is a sintered body and mean grain size of said sintered body is 5 μm or less.

7. A ferrite material according to claim 1, wherein said ferrite material is a sintered body and the standard deviation of the grain size of said sintered body is 2 μm or less.

8. A ferrite sintered body, which comprises 45.5 to 48 mol % of $Fe_2O_3$, 5 to 10.5 mol % of CuO, 26 to 30 mol % of ZnO, and the balance substantially being NiO, and which has a mean grain size of 5 μm or less and a standard deviation of a grain size of 2 μm or less.

9. A ferrite sintered body according to claim 8, wherein a quality factor (Q value) at 125 kHz is 140 or more.

10. A ferrite sintered body according to claim 8, which comprises, as an additive, cobalt oxide within a range between 0.005 and 0.045 wt % in terms of CoO.

11. A ferrite sintered body according to claim 8, which comprises, as an additive, cobalt oxide within a range between 0.01 and 0.03 wt % in terms of CoO.

12. A ferrite sintered body according to claim 8, wherein each of the absolute value of αμir$_{-40\sim20}$ and the absolute value of αμir$_{20\sim160}$ is 3 ppm/° C. or less,
  wherein $\alpha\mu i r_{-40\sim20}=[(\mu i_{20}-\mu i_{-40})/\mu i_{-40}^2]\times[1/(T_{20}-T_{-40})]$, $\alpha\mu i r_{20\sim160}=[(\mu i_{160}-\mu i_{20})/\mu i_{20}^2]\times[1/(T_{160}-T_{20})]$, μi$_{-40}$ represents an initial permeability at −40° C.,
  μi$_{20}$ represents an initial permeability at 20° C., and
  μi$_{160}$ represents an initial permeability at 160° C.

13. An inductor, which comprises:
  a ferrite sintered body comprising, as main constituents, 45.5 to 48 mol % of $Fe_2O_3$, 5 to 10.5 mol % of CuO, 26 to 29.5 mol % of ZnO, and the balance substantially being NiO, and further comprising, as an additive, cobalt oxide within a range between 0.005 and 0.045 wt % in terms of CoO; and
  a resin mold covering said ferrite sintered body.

14. An inductor, which comprises:
  a ferrite sintered body comprising 45.5 to 48 mol % of $Fe_2O_3$, 5 to 10.5 mol % of CuO, 26 to 30 mol % of ZnO, and the balance substantially being NiO, and having a mean grain size of 5 μm or less and a standard deviation of a grain size of 2 μm or less; and
  a resin mold covering said ferrite sintered body.

15. An inductor according to claim 13 or 14, wherein said ferrite sintered body has a bending strength of 20 kgf/mm$^2$ or more, and the absolute value of stress-insensitive characteristic of 5% or less,
  wherein a bending strength is a value measured according to JIS R1601, stress-insensitive characteristic=$(L_1-L_0)/L_0\times100$ (%)

$L_1$ represents an inductance value obtained when a uniaxial compressive force (1 ton/cm$^2$) is applied, and $L_0$ represents an inductance value obtained when a uniaxial compressive force (1 ton/cm$^2$) is not applied.

16. An inductor according to claim 13 or 14, wherein said ferrite sintered body has an initial permeability μi at 125 kHz of 300 or more.

17. An inductor according to claim 13 or 14, wherein with regard to said ferrite sintered body, each of the absolute value of αμir$_{-40\sim20}$ and the absolute value of αμir$_{20\sim160}$ is 3 ppm/°C. or less, wherein $$\alpha\mu i r_{-40\sim20} = [(\mu i_{20} - \mu i_{-40})/\mu i_{-40}^2] \times [1/(T_{20} - T_{-40})],$$

$$\alpha\mu i r_{20\sim160} = [(\mu i_{160} - \mu i_{20})/\mu i_{20}^2] \times [1/(T_{160} - T_{20})],$$

μi$_{-40}$ represents an initial permeability at −40°C.,

μi$_{20}$ represents an initial permeability at 20°C., and

μi$_{160}$ represents an initial permeability at 160°C.

18. A ferrite material which comprises, as main constituents, 45.5 to 48 mol % of Fe$_2$O$_3$, 5 to 10.5 mol % of CuO, 26 to 30 mol % of ZnO, and the balance substantially being NiO, and further comprises, as an additive, cobalt oxide witbin a range between 0.005 and 0.045 wt % in terms of CoO, wherein each of the absolute value of αμir$_{-40\sim20}$ and the absolute value of αμir$_{20\sim160}$ is 3 ppm/°C. or less, wherein $$\alpha\mu i r_{-40\sim20} = [(\mu i_{20} - \mu i_{-40})/\mu i_{-40}^2] \times [1/(T_{20} - T_{-40})],$$

$$\alpha\mu i r_{20\sim160} = [(\mu i_{160} - \mu i_{20})/\mu i_{20}^2] \times [1/(T_{160} - T_{20})],$$

μi$_{-40}$ represents an initial permeability at −40°C.,

μi$_{20}$ represents an initial permeability at 20°C., and

μi$_{160}$ represents an initial permeability at 160°C.

19. A ferrite material which comprises, as main constituents, 45.5 to 48 mol % of Fe$_2$O$_3$, 5 to 10.5 mol % of CuO, 26 to 30 mol % of ZnO, and the balance substantially being NiO, and further comprises, as an additive, cobalt oxide within a range between 0.005 and 0.045 wt % in terms of CoO, wherein each of the absolute value of αμir$_{-40\sim20}$ and the absolute value of αμir$_{20\sim160}$ is 3 ppm/°C. or less, which has a bending strength of 20 kgf/mm$^2$ or more, and the absolute value of stress-insensitive characteristic of 5% or less, wherein a bending strength is a value measured according to JIS R1601, stress-insensitive characteristic=$(L_1-L_0)/L_0\times100$ (%), $L_1$ represents an inductance value obtained when a uniaxial compressive force (1 ton/cm$^2$) is applied, and $L_0$ represents an inductance value obtained when a wmiaxial compressive force (1 ton/cm$^2$) is not applied.

20. A ferrite material which comprises, as main constituents, 45.5 to 48 mol % of Fe$_2$O$_3$, 5 to 10.5 mol % of CuO, 26 to 30 mol % of ZnO, and the balance substantially being NiO, wherein each of the absolute value of αμir$_{-40\sim20}$ and the absolute value of αμir$_{20\sim160}$ is 3 ppm/°C. or less, wherein $$\alpha\mu i r_{-40\sim20} = [(\mu i_{20} - \mu i_{-40})/\mu i_{-40}^2] \times [1/(T_{20} - T_{-40})],$$

$$\alpha\mu i r_{20\sim160} = [(\mu i_{160} - \mu i_{20})/\mu i_{20}^2] \times [1/(T_{160} - T_{20})],$$

μi$_{-40}$ represents an initial permeability at −40°C.,

μi$_{20}$ represents an initial permeability at 20°C., and

μi$_{160}$ represents an initial permeability at 160°C.

21. An inductor, which comprises a ferrite sintered body comprising, as main constituents, 45.5 to 48 mol % of Fe$_2$O$_3$, 5 to 10.6 mol % of CuO, 26 to 30 mol % of ZnO, and the balance substantially being NiO, and further comprising, as an additive, cobalt oxide within a range between 0.005 and 0.045 wt % in terms of CoO; and a resin mold covering said ferrite sintered body, wherein said ferrite sintered body has a bending strength of 20 kgf/mm$^2$ or more, and the absolute value of stress-insensitive characteristic of 5% or less, wherein a bending strength is a value measured according to JIS R1601, stress-insensitive charactenstic=$(L_1-L_0)/L0\times100$ (%)

$L_1$ represents an inductance value obtained when a uniarial compressive force (1 ton/cm$^2$) is applied, and $L_0$ represents an inductance value obtained when a uniaxial compressive force (1 ton/cm$^2$) is not applied.

22. An inductor, which comprises:

a ferrite sintered body comprising 45.5 to 48 mol % of Fe$_2$O$_3$, 5 to 10.5 mol % of CuO, 26 to 30 mol % of ZnO, and the balance substantially being NiO, and having a mean grain size of 5 μm or less and a standard deviation of a grain size of 2 μm or less; and a resin mold covering said ferrite sintered body, wherein said ferrite sintered body has a bending strength of 20 kgf/mm$^2$ or more, and the absolute value of stress-insensitive characteristic of 5% or less, wherein a bending strength is a value measured according to JIS R1601, stress-insensitive characteristic=$(L_1-L_0)/L0\times100$ (%)

$L_1$ represents an inductance value obtained when a uniaxial compressive force (1 ton/cm$^2$) is applied, and $L_0$ represents an inductance value obtained when a uniaxial compressive force (1 ton/cm$^2$) is not applied.

* * * * *